Patented Mar. 8, 1949

2,463,574

UNITED STATES PATENT OFFICE 2,463,574

VINYLIDENE CHLORIDE-BUTADIENE-ALPHA-METHYL STYRENE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,284

2 Claims. (Cl. 260—86.5)

This invention relates to vulcanizable interpolymers suitable for use as calendered coatings for flexible base materials and for use in the manufacture of synthetic rubber shoe soles and other mechanical rubber goods. It relates in particular to certain interpolymers of vinylidene chloride, a diene hydrocarbon such as butadiene-1,3 or isoprene, and alpha-methyl styrene.

Some of the binary copolymers of vinylidene chloride and alpha-methyl styrene are disclosed and claimed by Wiley in U. S. Patent No. 2,160,-932. The binary copolymers of butadiene-1,3 and alpha-methyl styrene have been suggested as well in the patent literature. The binary copolymers of vinylidene chloride and butadiene-1,3 are disclosed and claimed in U. S. Patents Nos. 2,215,-379, 2,376,208 and 2,380,356, issued to the assignees of Sebrell, Tucker and Youker, respectively.

The vinylidene chloride-alpha-methyl styrene binary copolymers are thermoplastics which are neither rubbery nor vulcanizable. They are rigid and relatively insoluble materials at high vinylidene chloride concentrations and become somewhat more soluble as the amount of copolymerized alpha-methyl styrene increases. Similarly, the binary copolymers of vinylidene chloride and butadiene-1,3 as well as the corresponding copolymers of vinylidene chloride and isoprene vary from rigid thermoplastic and highly insoluble materials at vinylidene chloride concentrations above 90 per cent through strong rubbers having from 20 to 50 per cent and more of butadiene or of isoprene. At least when some of the commoner polymerization methods are employed, the binary copolymers of vinylidene chloride and either butadiene-1,3 or isoprene, containing roughly from 60 to 90 per cent of the diene hydrocarbon, are factice-like solids of rather low strength which are capable of but little elongation. The binary copolymers of butadiene-1,3 or of isoprene and alpha-methyl styrene resemble somewhat closely the copolymers of corresponding proportion produced from butadiene and styrene. Though the binary copolymers mentioned above which contain a diene hydrocarbon are vulcanizable materials they are deficient as regards many required coating properties and, when prepared so as to simulate most closely the properties of natural rubber, their compositions are not ideal for use in the manufacture of shoe soles and they do not meet several of the requirements for mechanical rubber goods.

It is an object of the present invention to provide a vulcanizable synthetic rubber-like material which is adapted to form abrasion resistant and moisture impervious coatings, preferably by the relatively simple process of calendering the material on the desired base. Another object is to provide such a composition suitable for employment in the manufacture of shoe soles. A further object is to provide a vulcanizable synthetic rubber-like material which is resistant to abrasion and to the action of many chemicals and organic solvents and which is adapted for use in the manufacture of mechanical rubber goods. Other and related objects may appear hereinafter.

In the following description and claims the term "butadiene" is understood to signify the compound butadiene-1,3. The term "isoprene" refers to the compound 2-methyl butadiene-1,3. Alpha-methyl styrene is the compound sometimes referred to as isopropenyl benzene or as 2-phenyl propene. The term "interpolymer" is used herein to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of the ternary interpolymers produced from a monomeric mixture of from 15 to 80 per cent of vinylidene chloride, 15 to 50 per cent of the diene hydrocarbon and 5 to 70 per cent of alpha-methyl styrene. In its preferred modification the invention comprises the provision of an interpolymer of from 15 to 60 per cent vinylidene chloride, from 25 to 40 per cent of butadiene and from 15 to 60 per cent of alpha-methyl styrene.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and Le Fevre in U. S. Patent No. 2,333,633. They have also been made in aqueous suspension, without emulsifying agents, using benzoyl peroxide as the catalyst. For the present purposes of comparison between the various compositions in the interpolymer system under consideration, a standard polymerization procedure was adopted eliminating as far as possible any variations due to changes in relative concentrations of the disperse and continuous phases, catalyst, temperatures, emulsifiers, alkalies and the like. The standard procedure for small scale preparations is as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is added 25 parts by weight of the chosen monomers in the proportions being investigated, and 0.125 part of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant, such as polymerized trimethyl dehydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

The new interpolymers may be used either in their natural state, or after being compounded, for the purpose of applying coatings to flexible base materials or for the preparation of moldings, sheet or film. A wide variety of formulations may be employed to yield satisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight:

| | |
|---|---|
| Interpolymer | 100 |
| Stearic acid | 1 |
| Butyl phthalyl butyl glycolate (plasticizer) | 10 |
| Litharge | 5 |
| Benzothiazyl disulfide (accelerator) | 1 |
| Sulfur | 2 |
| Carbon black | 35-40 |

(The preferred carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles, before they are adapted to use in commerce. Such cure can be effected at about 138° C. with or without the application of superatmospheric pressure (suitably up to 400 pounds per square inch) for periods up to about 75 minutes.

It has been found that the presence of alpha-methyl styrene in the monomeric mixture of vinylidene chloride and butadiene being subjected to polymerization results in the formation of a much more homogeneous interpolymer than is formed in the absence of this material. The presence of the alpha-methyl styrene permits carrying the polymerization to a high degree of conversion without encountering any injurious oxidation effects such as are met when it is attempted to carry the polymerization of the binary vinylidene chloride-butadiene system beyond about 75 per cent conversion to polymer. When the said binary system is carried beyond about 75 per cent conversion there is a noticeable discoloration of the latex and of the polymer obtainable therefrom. This is believed to be due, in part at least, to the rapid consumption of butadiene in the binary system, resulting in a final reaction period during which the principal polymerizable material remaining is vinylidene chloride. When alpha-methyl styrene has been added to the mixture, the butadiene is not consumed nearly as rapidly as in the binary system and the more homogeneous polymerization prevents the oxidation of the previously formed polymer. Hence, in making the present ternary interpolymer, the oxidative degradation is not observed even when polymerization is carried to 90 per cent or higher, and the product retains its desirable rubbery properties without exhibiting discoloration.

In the crude condition (neither compounded nor cured) the preferred interpolymers of the present invention all exhibit elongation values over 600 per cent and all of them have tensile strength values over 400 pounds per square inch, ranging up to nearly 600 pounds per square inch. The same interpolymers in the crude condition exhibit extremely low permanent set values ranging from 1 to 4 per cent.

The new interpolymers containing alpha-methyl styrene have a much lower internal friction during fabrication than does the binary copolymer of 70 per cent vinylidene chloride and 30 per cent butadiene (hereinafter referred to for purposes of comparison as copolymer A). This reduced internal friction, which makes for greater ease of fabrication in processes involving calendering or extrusion, is evidenced by the Mooney viscosity values of the new interpolymers, determined in the manner described in India Rubber World for April 1, 1935, at page 49. The new copolymers which are most readily milled, extruded and molded are those containing from about 15 to about 60 per cent of alpha-methyl styrene, from 15 to 60 per cent of vinylidene chloride and from 25 to 40 per cent of butadiene. These interpolymers have Mooney viscosity values, measured at 212° F., ranging from about 43 to about 88 while copolymer A has an average value in this test of about 180.

The new interpolymers in the same range of proportions which exhibit the lowest Mooney viscosities also exhibit minimum resilience as measured by the Bashore rebound test. In this test copolymer A gives an average value of about 15 per cent, whereas the ternary interpolymers of from 15 to 60 per cent each of vinylidene chloride and alpha-methyl styrene and from 25 to 40 per cent of butadiene give values ranging from 3 to 8.

Samples of the new interpolymers were molded to form discs of two inch radius, 100 mil thick and, after being carefully weighed, were mounted on the rotating table of an abrasion testing machine and were subjected to the abrasive action of special grinding wheels under a total load of 1,000 grams. The table of the testing machine was rotated for 500 cycles, after which the samples were brushed and reweighed. In this test copolymer A had an average weight loss of .0016 gram. The interpolymer of 30 per cent of butadiene, 10 per cent of alpha-methyl styrene and 60 per cent of vinylidene chloride had a weight loss of .0014 gram. In contrast it was discovered that the ternary interpolymers containing from 25 to 55 per cent of alpha-methyl styrene, from 15 to 45 per cent of vinylidene chloride and 30 per cent of butadiene exhibited no loss in weight during the described test. Thus, it is observed that, in the preferred range of interpolymer proportions, the new materials have an interesting combination of low viscosity, high abrasion resistance and low resilience. Such a combination is very desirable in the manufacture of synthetic rubber shoe soles as well as the manufacture of a number of other rubber goods, particularly for mechanical uses. The low resilience is of especial value wherever a rubberlike material must be stitched and will thereafter be subjected to flexing, as it assists in preventing the stitches from cutting through the rubber. The low viscosity simplifies the manufacturing operation, since with this property it is possible to have very short production cycles, especially in molding operations. The advantage of a highly abrasion resistant material for the described purposes is believed to be apparent.

The electrical properties of the new interpolymers are all superior to those of copolymer A, as they all have much lower per cent power factor and much lower dielectric constant, both at 1,000 and at 1,000,000 cycles per second, than does copolymer A. The ease with which the new interpolymers may be extruded thus makes them especially desirable for coating wire for use in electrical apparatus.

The new interpolymers are at least as resistant to the action of most commonly encountered chemicals as are copolymer A and many other synthetic rubbers known to the art. While they are subject to swelling when exposed to the action of some organic solvents, they are highly resistant to the action of petroleum distillates, including lubricating and other mineral oils.

In the compounded and cured condition, samples of the new interpolymer containing about 55 per cent vinylidene chloride, 15 per cent alpha-methyl styrene and 30 per cent butadiene have been found to have low temperature brittle points near —27° C. whereas a similarly compounded and cured sample of copolymer A has a brittle point of only —20° C. This is indicative of a somewhat greater flexibility for the new interpolymer over a wide useful temperature range.

In the compounded and cured condition the interpolymer of 55 per cent vinylidene chloride, 15 per cent alpha-methyl styrene and 30 per cent butadiene has a tensile stress value, at 100 per cent elongation, of 1,140 pounds per square inch in contrast to a value of only 785 pounds per square inch for similarly compounded, cured and stressed sample of copolymer A.

The preceding examples in which specific compositions have been identified have been based on ternary interpolymers containing 30 per cent of butadiene. Tests have shown that comparable results are obtained when the butadiene content varies in the previously defined preferred range of from 25 to 40 per cent and that the interpolymers containing from 15 to 50 per cent butadiene, in the broad range of proportions initially disclosed, all show advantageous properties in comparison with the corresponding adjacent binary copolymers of butadiene and vinylidene chloride. Similar advantage may be shown for the new ternary interpolymers containing isoprene, in comparison with the corresponding vinylidene chloride isoprene copolymers.

We claim:

1. A vulcanizable interpolymer made by dispersing in water and polymerizing together a monomeric mixture of from 15 to 60 per cent of vinylidene chloride, from 25 to 40 per cent of butadiene-1,3 and from 15 to 60 per cent of alpha-methyl styrene.

2. A vulcanizable interpolymer made by dispersing in water and polymerizing together a monomeric mixture of from 15 to 45 per cent of vinylidene chloride, 30 per cent of butadiene-1,3 and the balance, from 55 to 25 per cent, of alpha-methyl styrene.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,388,372 | Stewart | Nov. 6, 1945 |
| 2,388,373 | Stewart | Nov. 6, 1945 |
| 2,391,233 | Gruber | Dec. 18, 1945 |
| 2,395,505 | Sarbach | Feb. 26, 1946 |
| 2,395,507 | Sauser | Feb. 26, 1946 |